(12) United States Patent
Molesworth et al.

(10) Patent No.: US 11,746,818 B2
(45) Date of Patent: Sep. 5, 2023

(54) WEAR LINER

(71) Applicant: Elastotec Pty Limited, Somersby (AU)

(72) Inventors: David Molesworth, Somersby (AU); Justin Minto, Thornleigh (AU)

(73) Assignee: ELASTOTEC PTY LIMITED, Somersby (AU)

(*) Notice: Subject to any disclaimer, the term of this patent is extended or adjusted under 35 U.S.C. 154(b) by 0 days.

(21) Appl. No.: 17/619,553

(22) PCT Filed: Jun. 18, 2020

(86) PCT No.: PCT/AU2020/050614
§ 371 (c)(1),
(2) Date: Dec. 15, 2021

(87) PCT Pub. No.: WO2020/252528
PCT Pub. Date: Dec. 24, 2020

(65) Prior Publication Data
US 2022/0307538 A1 Sep. 29, 2022

(30) Foreign Application Priority Data
Jun. 18, 2019 (AU) .................................. 2019902116

(51) Int. Cl.
F16B 23/00 (2006.01)
B65G 11/16 (2006.01)
(Continued)

(52) U.S. Cl.
CPC ........ *F16B 23/0069* (2013.01); *B65G 11/166* (2013.01); *B65G 2201/045* (2013.01);
(Continued)

(58) Field of Classification Search
CPC ................ F16B 23/0069; F16B 11/006; F16B 2001/0035; F16B 4/004; F16B 17/008;
(Continued)

(56) References Cited

FOREIGN PATENT DOCUMENTS

| CA | 2708325 A1 | 6/2011 | |
| CA | 2708325 A1 * | 6/2011 | ............. B65G 11/16 |

(Continued)

OTHER PUBLICATIONS

Песляк Павел Мстиславович; Layer Plate with Magnetic Elements; Apr. 10, 2012; English Machine Translation; p. 1-3 (Year: 2023).*

(Continued)

*Primary Examiner* — Bayan Salone
(74) *Attorney, Agent, or Firm* — Morgan, Lewis & Bockius LLP

(57) ABSTRACT

According to the invention, there is provided a magnetic wear liner (10) for protecting an underlying metallic surface (12) of a materials handling device from wear or damage during use. The magnetic wear liner includes a substantially rigid base (16) and one or more wear lining tiles (18) disposed on one side of the rigid base. The magnetic wear liner further includes one or more magnet devices (26) engageable with the rigid base such that a selective portion of the wear liner (10) is magnetically attracted to the underlying metallic surface.

19 Claims, 9 Drawing Sheets

(51) Int. Cl.
*F16B 4/00* (2006.01)
*F16B 11/00* (2006.01)
*F16B 1/00* (2006.01)

(52) U.S. Cl.
CPC .......... *B65G 2207/48* (2013.01); *F16B 4/004* (2013.01); *F16B 11/006* (2013.01); *F16B 2001/0035* (2013.01)

(58) Field of Classification Search
CPC .. B65G 2207/48; B65G 11/166; B65G 11/16; B65G 2201/045; B02C 17/22; B65D 90/043; B65D 2313/04
See application file for complete search history.

(56) References Cited

FOREIGN PATENT DOCUMENTS

| CN | 2529844 | Y | | 1/2003 | | |
| CN | 104801402 | A | | 7/2015 | | |
| CN | 106423432 | A | * | 2/2017 | ............. | B02C 17/22 |
| CN | 208321333 | U | | 1/2019 | | |
| CN | 208321333 | U | * | 1/2019 | | |
| CN | 106423432 | B | | 4/2019 | | |
| CN | 109663642 | A | | 4/2019 | | |
| CN | 109663642 | A | * | 4/2019 | | |
| CN | 109878970 | A | | 6/2019 | | |
| CN | 109878970 | A | * | 6/2019 | | |
| CN | 218609693 | U | * | 3/2023 | | |
| RU | 114622 | | | 4/2012 | | |
| RU | 114622 | U1 | * | 4/2012 | | |

OTHER PUBLICATIONS

Yu et al.; A Composite Magnetic Ceramic Rubber Lining Board; Apr. 23, 2019; English Machine Translation; pp. 1-4 (Year: 2023).*
International Search Report and Written Opinion dated Aug. 26, 2020 for International Patent Application No. PCT/AU2020/050614, 9 pages.
Notification of Transmittal of International Preliminary Report on Patentability dated Jun. 25, 2021 for International Patent Application No. PCT/AU2020/050614, 42 pages.
Examination Report issued in corresponding Chinese Patent Application No. 202080044893.3 dated Feb. 24, 2023, 8 pages.

* cited by examiner

WEAR LINER

CROSS REFERENCE TO RELATED APPLICATIONS

This application is a U.S. National Phase of International Patent Application No. PCT/AU2020/050614 filed Jun. 18, 2020 entitled "Wear Liner", which claims the benefit of Australian Patent Application No. 2019902116 filed Jun. 18, 2019, entitled "Wear Liner", each of which is incorporated herein by reference in its entirety for all purposes.

FIELD OF INVENTION

The present relates to wear liners and, in particular, to replaceable wear liners.

The invention has been developed primarily for use as a replaceable wear liner used to protect the surfaces of materials handling equipment from wear and damage during use and will be described hereinafter with reference to this application. However, it will be appreciated that the invention is not limited to this particular field of use.

BACKGROUND

The following discussion of the prior art is intended to place the invention in an appropriate technical context and enable the associated advantages to be fully understood. However, any discussion of the prior art throughout the specification should not be considered as an admission that such art is widely known or forms part of the common general knowledge in the field.

The transport of ore, or other mined material, represents a significant part of most mining and mineral processing operations. The ore is typically transported using conveyor belts, which empty into transfer chutes for movement from conveyor to conveyor, or into storage hoppers, as required. The conveyed ore material may include coal, rocks and aggregate and is therefore typically hard and abrasive. As a result, the inner surfaces of these transfer chutes, hoppers and other ore delivery equipment are subjected to damaging high impact and frictional forces.

In order to protect these inner surfaces from damage and wear, they are normally lined with removable ceramic, steel, polyurethane, or rubber wear tiles. These wear tiles are designed to wear over time and replaced when they become too thin or damaged. The wear tiles are typically grouped and housed in rubber, which is then adhered to a solid base to provide resilience to impact loads. A group of wear tiles mounted on a common base is normally referred to as a single wear liner.

Typically, the wear liners are held in place on the underlying surface of each chute, or other device, by way of mechanical fasteners, such as by threaded fasteners or welded threaded rods. These fasteners or rods typically protrude from the underside of each wear liner to engage with corresponding holes in the surface of the underlying structure. On the other side of the underlying structure, the fasteners or rods engage with nuts to retain the liners in position.

Whilst this arrangement has provided an acceptable and reliable means of fixing wear liners in the past, with the rising value of mined materials, one problem with using mechanical fasteners for this use is the time required for installation or replacing worn wear liners during mine maintenance periods. With downtime of a mining transfer chute potentially costing millions of dollars per hour in lost profits, excessive maintenance delays are unacceptable to mining and mineral processing operators. Therefore, any reduction of downtime would add substantially to the mining operation profits.

Furthermore, access to the underside of each chute to either release or secure each nut may be problematic because of the height of each chute off the ground surface. In most cases, this requires scaffolding to be erected, which is time-consuming, costly and a potential safety concern for the maintenance personnel.

A further problem with using mechanical fasteners is the loss of strength of the underlying structure due to the many installation holes that are required. Without any requirement for these holes, the transfer chute would be stronger and require less maintenance, again reducing downtime in mining operations.

It is an object of the present invention to overcome or ameliorate at least one of the disadvantages of the prior art, or to provide a useful alternative.

It is an object of invention is at least one preferred form, to provide a wear liner that is relatively quicker and safer to remove and install than prior art wear liners. A further object of invention in at least one preferred form, is to provide a wear liner that does not require installation holes in the underlying surface.

SUMMARY OF THE INVENTION

According to a first aspect, the present invention provides a magnetic wear liner for protecting an underlying metallic surface of a materials handling device from wear or damage during use, the wear liner including:

a substantially rigid base having one or more recesses;

one or more wear lining tiles being fixed to and covering one side of the rigid base; and one or more magnet devices each removably engageable with one of said recesses such that a selective portion of the rigid base is magnetically attracted to the underlying metallic surface.

In one embodiment, the rigid base includes one or more recesses and wherein the one or more magnet devices is removably engageable with the one or more recesses. Preferably, the one or more magnet devices are screwingly engageable with the one or more recesses.

In one embodiment, the one or more recesses are equidistantly spaced about the rigid base.

In one embodiment, each of the one or more magnet devices includes a magnet and an outer retaining ring.

In one embodiment, upon engagement between the one or more magnet devices and the one or more recesses, each magnet device does not protrude past the other side of said rigid base.

In one embodiment, the rigid plate is formed from a thermoplastic or thermoset material.

In one embodiment, each of the one or more magnet devices includes two or more peripherally located locking cut-outs for allowing installation and removal.

In one embodiment, the rigid base includes at least one peripherally located cut-out for allowing the wear liner to be levered from the underlying metallic surface.

In one embodiment, the one or more wear lining tiles include one or more ceramic blocks. Alternatively, the one or more wear lining tiles include one or more steel blocks. Preferably, the one or more blocks are adhered to the rigid base.

In one embodiment, the magnetic wear liner includes a lifting eye plate for lifting the magnetic wear liner from the underlying metallic surface. Preferably, the lifting eye plate protrudes from the rigid base. More preferably, the lifting eye plate includes an access hole.

According to a second aspect, the present invention provides a method of installing one or more magnetic wear liners according to the first aspect, on an underlying metallic surface of a materials handling device, the method including the steps of:

selectively engaging one or more magnet devices with the rigid base such that a selective portion of the rigid base is magnetically attractable to the underlying metallic surface; and positioning the magnetic wear liner in a desired position on the underlying metallic surface in a contiguous orientation relative to a previously installed magnetic wear liner.

In one embodiment, the method includes the step of cutting the magnetic wear liner such that it defines selective size.

In one embodiment, the method includes the step of installing a stop bar on the underlying metallic surface. Preferably, the method includes the step of positioning the magnetic wear liner in abutting engagement with the stop bar.

According to a third aspect, the present invention provides a magnet device for use in a magnetic wear liner according to the first and second aspects.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

BRIEF DESCRIPTION OF DRAWINGS

Preferred embodiments of the invention will now be described, by way of example only, with reference to the accompanying drawings in which.

DETAILED DESCRIPTION OF THE PREFERRED EMBODIMENTS

Figure 1:
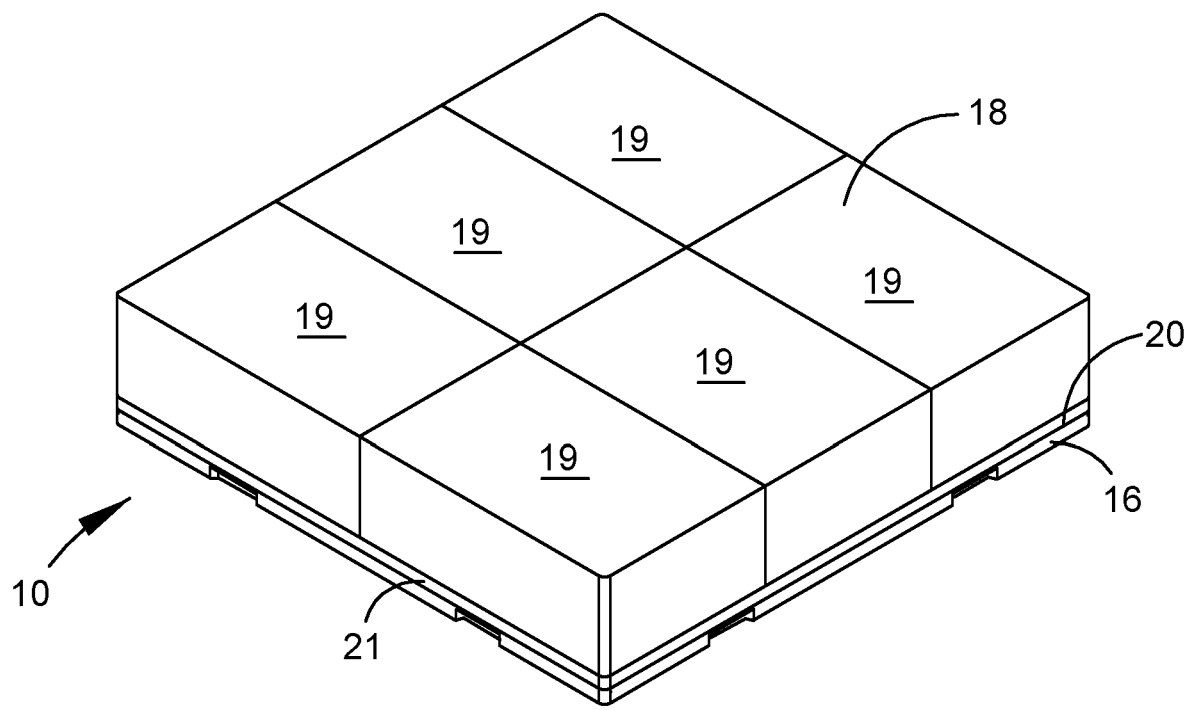
FIG. 1 is a perspective view of a magnetic wear liner in accordance with one embodiment of the present invention.

Exemplary embodiments of the present invention will now be described in detail with reference to the accompanying drawings. In the drawings, the same elements are denoted by the same reference numerals throughout. In the following description, detailed descriptions of known functions and configurations incorporated herein have been omitted for conciseness and clarity.

Figure 2:
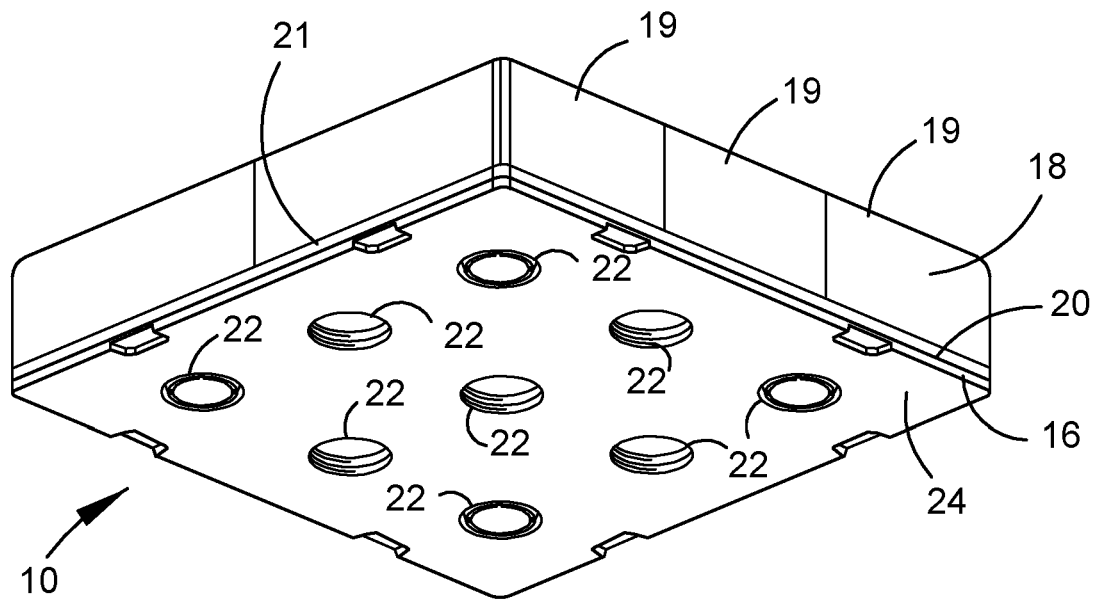
FIG. 2 is an underside perspective view of the magnetic wear liner of FIG. 1.

Referring to the accompanying drawings and initially to FIGS. 1 and 2, there is provided a magnetic wear liner 10 according to one embodiment of the present invention. As discussed in further detail below, the magnetic wear liner 10 of the present invention has been developed to protect the internal surfaces of ore handling equipment such as chutes and/or hoppers, from wear and/or damage during ore transport or storing operations. The chutes and/or hoppers are formed from metallic materials, which allow a plurality of the magnetic wear liners 10 to be installed on their inner surfaces and positionally retained using magnetic attraction.

The wear liner 10 includes a substantially rigid base 16 and one or more wear lining tiles 18 disposed on one side 20 of the rigid base. It should be appreciated that throughout the specification, the term rigid should be interpreted as meaning substantially inflexible and generally resistant to bending as is known in the art.

In the illustrated embodiment, the rigid base 16 is formed from a rigid engineered thermoplastic or a thermoset material. Having the base formed a rigid plastic material ideally allows easier single pass shape cutting of the wear liner 10 when required to fit into non-regular or smaller spaces on the internal surfaces of ore handling equipment. Rigid engineered plastics are also significantly cheaper to manufacture due to the absence of any machining compared to metallic materials. The engineered thermoplastics or thermoset material is also of relatively lighter weight compared to a metallic material and further ideally minimises corrosion. It is proposed that the rigid base of the illustrated embodiment would be produced by an injection moulding process, where the complete base including any required apertures, are moulded in one step.

In another embodiment, the base may be formed from rigid mild steel. In yet another embodiment, the base is formed from aluminium. In this regard, it should be appreciated that the base may be formed from any rigid material known in the art without departing from the scope of the invention.

Rigid base 16 is shown in the form of a planar square section, however, in other not shown embodiments, the rigid base may be non-planar and may be curved to fit onto curved surfaces or include cut-outs, raised and/or lowered portions.

In the illustrated embodiment, the one or more wear lining tiles 18 include a plurality of blocks 19 formed from a ceramic material. The blocks 19 are adhered in position in a rubber mounting 21. The rubber mounting 21 is in turn, adhered to the rigid base 16 using an adhesive or vulcanising process. In a further embodiment, blocks 19 may be formed from a metallic, polyurethane, ultra-high molecular weight polyethylene (UHMWPE) material, or any other wear lining material known in the art.

Figure 3:
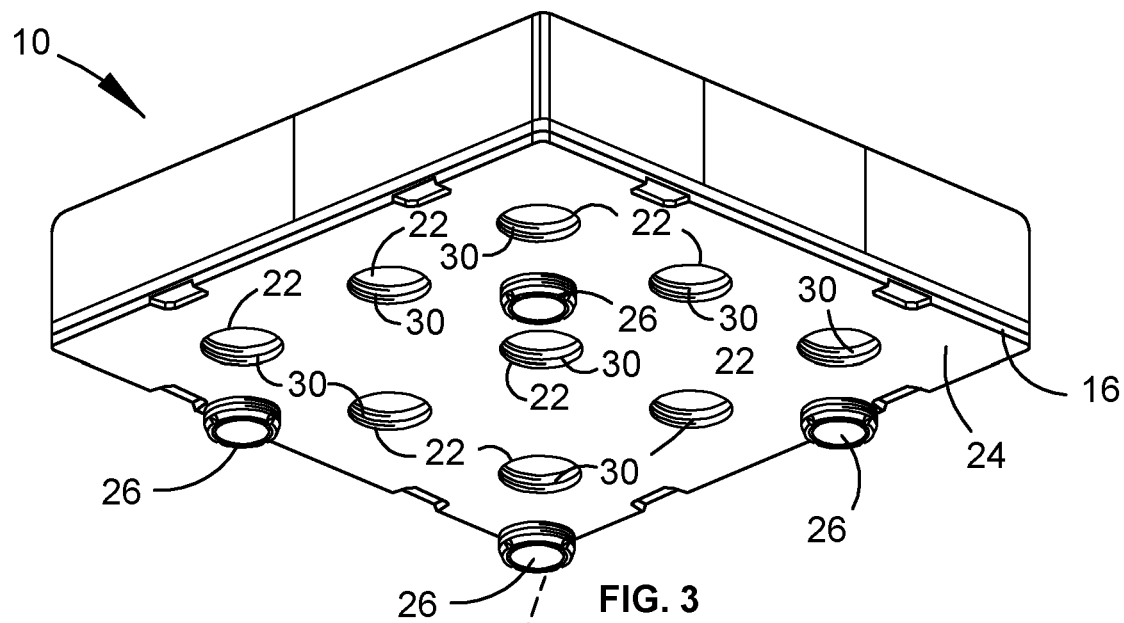
FIG. 3 is an underside perspective view of the magnetic wear liner of FIG. 1 partly disassembled showing several magnet devices.

With reference now to FIG. 3, according to the invention, the rigid base is engageable with one or more magnet devices 26. To achieve this engagement, the rigid base 16 includes one or more recesses 22, which are accessible from its underside 24 in the present embodiment. Each magnet device 26 is configured to selectively and removably engage with a corresponding recess 22 thereby creating a magnetic attractive force at the point of engagement. Once the magnet devices are engaged, a selective portion of the wear liner 10 can be magnetically retained to an underlying metallic surface.

In the illustrated embodiment, the magnetic wear liner 10 includes an array of equidistantly spaced recesses 22, each magnet device 26 being screwingly engageable with a single recess 22. More specifically, it can be seen that an array of nine equidistant recesses together and four magnet devices 26 have been provided. Under these circumstances, four magnet devices 26 are screwingly engageable with four of the nine recesses 22 to define a magnetic attraction at those engagement locations. It should be therefore appreciated that by providing and array of nine recesses in this embodiment, nine possible predefined positions for each magnet device 26 is provided.

According to the invention, not all of the recesses 22 are required to engage with a corresponding magnet device for the wear liner 10 to be sufficiently held in position on the metallic underlying surface 12. However, by having a plurality of recesses in predefined positions about the rigid base, a selective portion of the wear liner can be magnetically retained to the underlying metallic surface. In this way, there will be enough recesses to allow sufficient magnetic attraction to the underlying surface 12 in the event that any trimming or cutting of the wear liner 10 is required to fit within specified boundary.

In order to achieve a sufficient attraction force, it is proposed that each magnet device 26 apply of magnetic attractive force of between 20 and 200 kgs, and more preferably between 20 and 80 kg. In this way, the wear liner 10 can be retained with only one magnet device, if it is cut down to a minimal size.

Figure 3A:
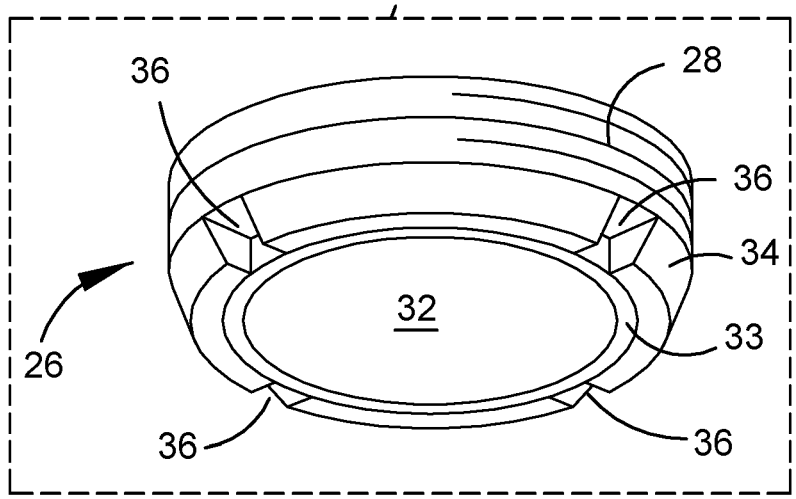
FIG. 3a is an enlarged view of one magnet device from FIG. 3.

As best shown in FIG. 3a, to engage with each recess 22, each magnet device 26 includes a screw thread 28 on its outer circumference. Similarly, each recess 22 includes an internal screw thread 30 complementary to the screw thread of the magnet device. This configuration allows a user to screwingly engage each magnet device 26 with any one of the recesses 22 until it is flush with the underside 24 of the base 16. By having the magnet devices engaged in this way, the wear liner 10 can be flush mounted to the metallic underlying surface 12.

In the illustrated embodiment, each magnet device 26 includes a circular magnet 32 surrounded by a rigid outer retaining ring 34, which includes the screw thread 28. In one preferred embodiment, the rigid outer retaining ring 34 is retained to the magnet 32 using a suitable adhesive. In further embodiments, the magnet 32 may be retained within the rigid outer ring 34 using a mechanical press fit.

Each magnet device 26 includes two or more peripherally located locking depressions 36 located in the rigid outer retaining ring 34 to allow screw engagement and removal with each of the recesses. In the illustrated embodiment, four locking depressions 36 have been provided. The locking depressions are engageable with corresponding engagement lugs of a standard tool (not shown) to facilitate rotation as known in the art. This tool may be provided with the magnet devices or provided separately.

In a further embodiment, each magnet device 26 may engage with each recess using a bayonet or other type of mechanical engagement without departing from the scope of the invention.

In yet a further embodiment, and in the case where the rigid base 16 is formed from a metallic material, each magnet device 26 is in the form of a single magnet (without retaining ring) which directly engages with the second side 24 of the rigid base 16. Under these circumstances, the magnet devices use magnetic force to engage with the rigid base 16. In this embodiment, the rigid base 16 may also include one or more recesses for providing clearance for the magnet devices. Using this arrangement, the magnet devices do not interfere with the rigid base directly contacting the underlying surface 12. Furthermore, using this embodiment, the magnets do not need be circular and are easily removable by gripping the free end and pulling the magnet devices away from the rigid base 16

In yet a further not shown embodiment, each magnet device 26 is again in the form of a single magnet, which directly engages with recesses in the rigid base 16, without requiring threads or other mechanical fastening formations. In this embodiment, the magnet devices are retained to the rigid base 16, which may be formed from any rigid material) using an adhesive applied to either each magnet device or each recess, before magnet device insertion. After the magnet devices 26 are adhered in position, they may be removed from the base if required by applying a heat source, such as for example from a heat flame. As is commonly known in the art, heat from the heat source acts to dissolve the adhesive and allows removal of the magnet device.

Figure 4:
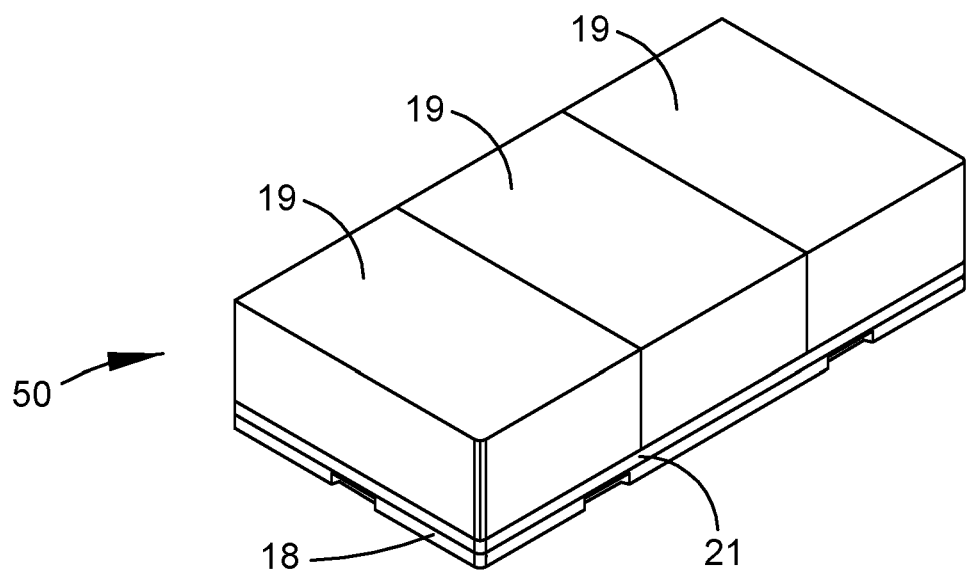
FIG. 4 is a perspective view of a magnetic wear liner in accordance with another embodiment of the present invention.
Figure 5:
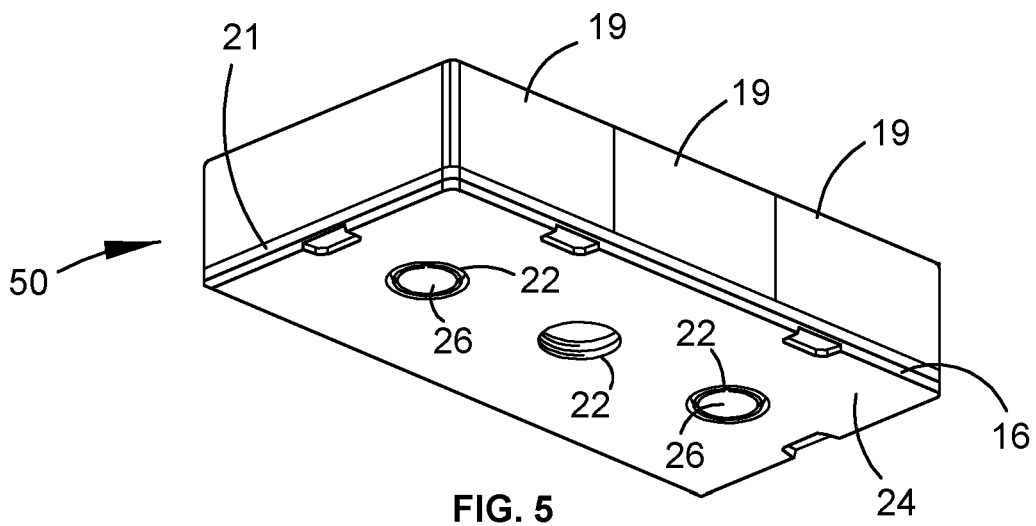
FIG. 5 is an underside perspective view of the magnetic wear liner of FIG. 4.

Referring to FIGS. 4 and 5, a smaller magnetic wear liner 50 according to a further embodiment is shown. In this embodiment, each wear liner 50 is provided with only three blocks 19 and only three recesses 22 in its rigid base. It is proposed that this wear liner be used for smaller spaces on the underlying surface 12. As shown, only two of the recesses are engaged with magnet devices 26, however, three or one magnet devices could be used if so desired.

Figure 6:
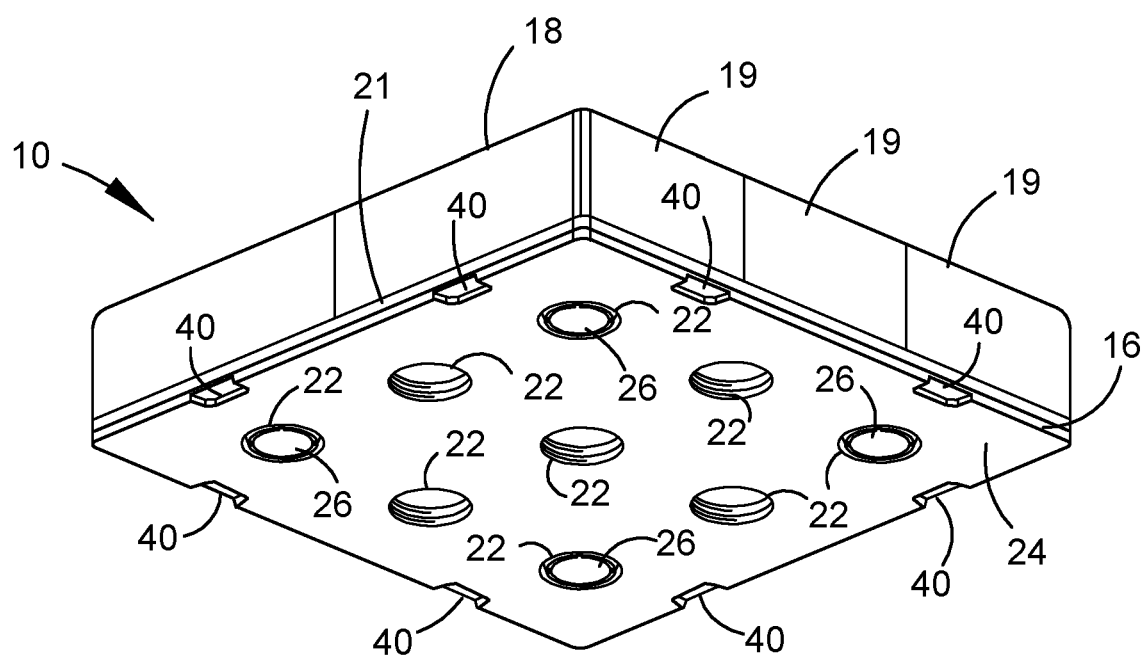
FIG. 6 is a further underside perspective view of the magnetic wear liner of FIG. 1.

With reference now to FIG. 6, the first embodiment magnetic wear liner 10 is again depicted. As shown, wear liner 10 further includes at least one peripherally located removal cut-out 40 to assist in removal of the wear liner from the metallic underlying surface one magnetically engaged. More specifically, eight peripherally located removal cut-outs are provided in this embodiment, with two provided on each side.

Removal cut-outs 40 allow the wear liner 10 to be removed from the underlying metallic surface 12, by providing access for a lever type tool. In this regard, many tools known to the skilled person beyond a simple lever tool could be used to lever the wear liner using these cut-outs 40. In one example, one end of a crow bar could be inserted into each removal cut-out 40 to lever the wear liner 10 away from the underlying surface. In another example, a claw hammer could be used to remove the wear liner using cut-outs 40. It should be appreciated that the magnetic force retaining each wear liner 10 to the underlying surface 12 substantially diminishes once one end of the wear liner 10 is levered a relatively small distance away from the metallic underlying surface. This means that a user is only required to apply a short levering action to break the magnetic attraction and remove the wear liner from the underlying surface, making removal advantageously quick and easy.

Figure 7:
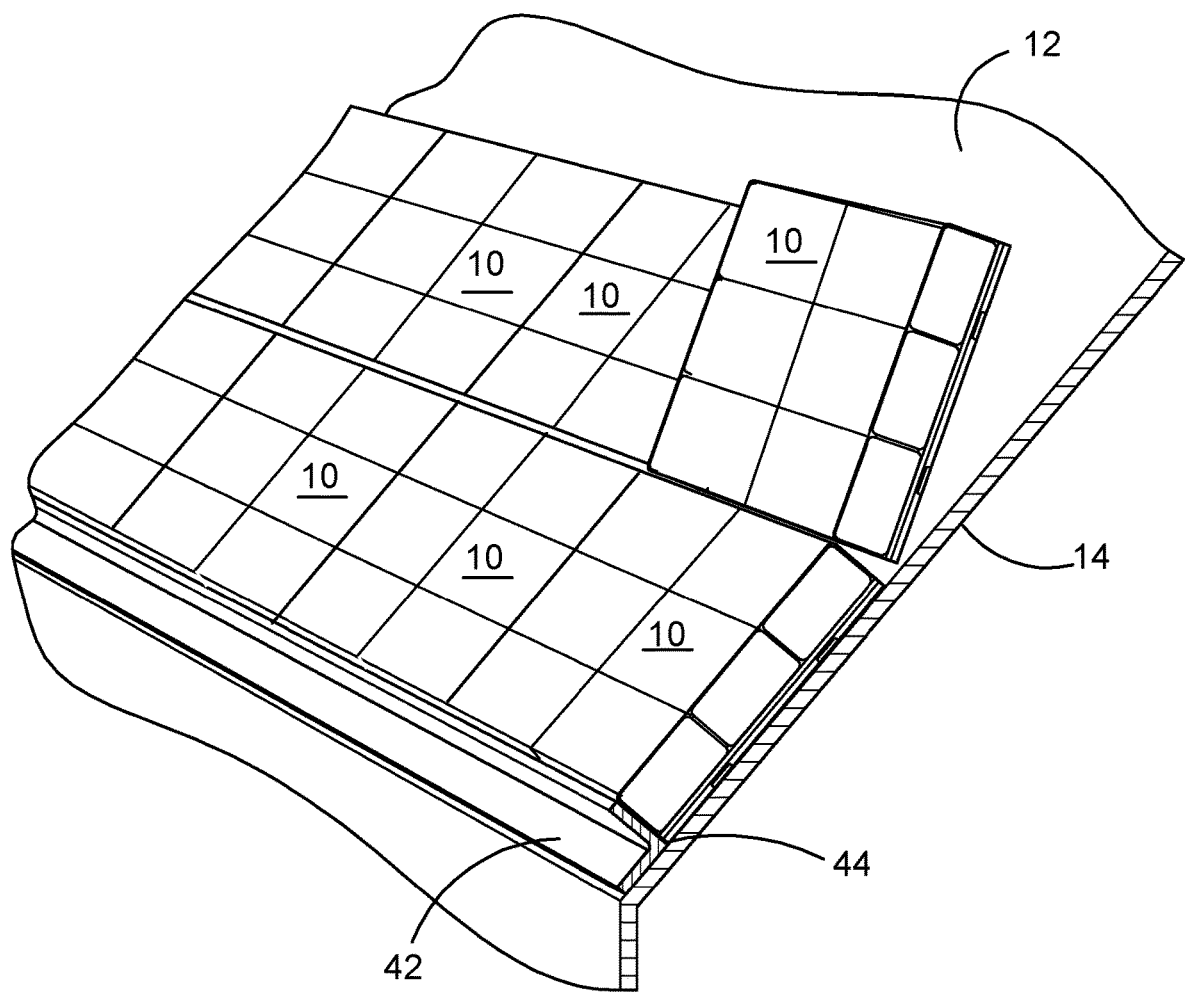
FIG. 7 is a perspective view of plurality magnetic wear liners of FIG. 1 being installed on an underlying surface.

With additional reference to FIG. 7, the method of installation of wear liner 10 onto an underlying metallic surface 12 of the materials handling device 14 will now be described. As previously mentioned, the underlying metallic surface 12 is typically the inside surface of an ore transfer chute and the wear liner 10 is used to protect the surface from damage during ore transport.

In this respect, the first step is to selectively engage one or more of the recesses 22 with a magnet device 26 (as shown in FIGS. 3 and 3a) such that a selective portion of the second side 24 is magnetically attractable to the metallic surface 12. In a typical case where the whole square wear liner 10 is to be used, it is proposed that the four magnet devices 26 are engaged with the recesses 22 corresponding to the four corners of the wear liner 10. If the wear liner 50 from the embodiments depicted in FIG. 4 and FIG. 5 are used, it is proposed that magnet devices 26 are engaged with the two end recesses 22. In order to minimise installation time, the magnet devices 26 are ideally pre-engaged with the recesses on a bench.

Where a straight and square start point is not available, a stop bar 42 maybe attached to the underlying metallic surface 12 thereby defining an aligned start point 44 and a hard edge for the wear liners 10 to rest against. In this regard, it should be appreciated that without continuous contiguous engagement with adjacent tiles or a hard edge, the wear liners 10 may creep and move due to the vibrations incurred during use of the material handling device 14.

It is proposed that the stop bar 42 is mechanically attached to the underlying surface 12 by either mechanical fasteners (not shown) or by welding. Advantageously, stop bar 42 can be cut to fit the particular configuration. Alternatively, a rigid edge of the underlying surface, such as an edge of a chute device, could be used as a start point.

Starting at the stop bar 42, each wear liner 10 is then placed in position in a contiguous abutting formation until the desired portion of the underlying surface 12 is covered. Optionally, a rubber hammer can be used to assist in minor positioning each of wear liner once it has made initial contact with the underlying surface.

If a wear liner 10 is required to be cut so that it will fit into a desired location, which is a common practice known in the art, magnet devices 26 are engaged with one or more of the remaining recesses 22 left over after the cutting so that a selective portion of the rigid base is magnetically attracted to the underlying surface. In this way, the wear liner 10 of the present invention allows a desired portion of the underlying metallic surface 12 to be covered with wear liners 10 with no remaining gaps. Advantageously, installation of the wear liners of the present invention is a quick and easy process relative to prior art wear liners that require engagement of mechanical fasteners, which are secured from the other side of the underlying metallic surface, to install each wear liner in position.

It should be appreciated that when the blocks 19 of wear liner 10 wear or are damaged during use, the wear liner 10 of the present invention can be easily removed and replaced. In order to achieve this, the wear liner 10 is simply withdrawn off the underlying surface 12 by levering using cut-outs 40 and replaced on site. If required, the previously engaged magnet devices 26 can be removed and used again. Alternatively, new magnet devices 26 can be used for the replacement wear liner 10. Again, advantageously, this is a quick and easy process relative to prior art wear liners that require removal of mechanical fasteners.

Figure 8:
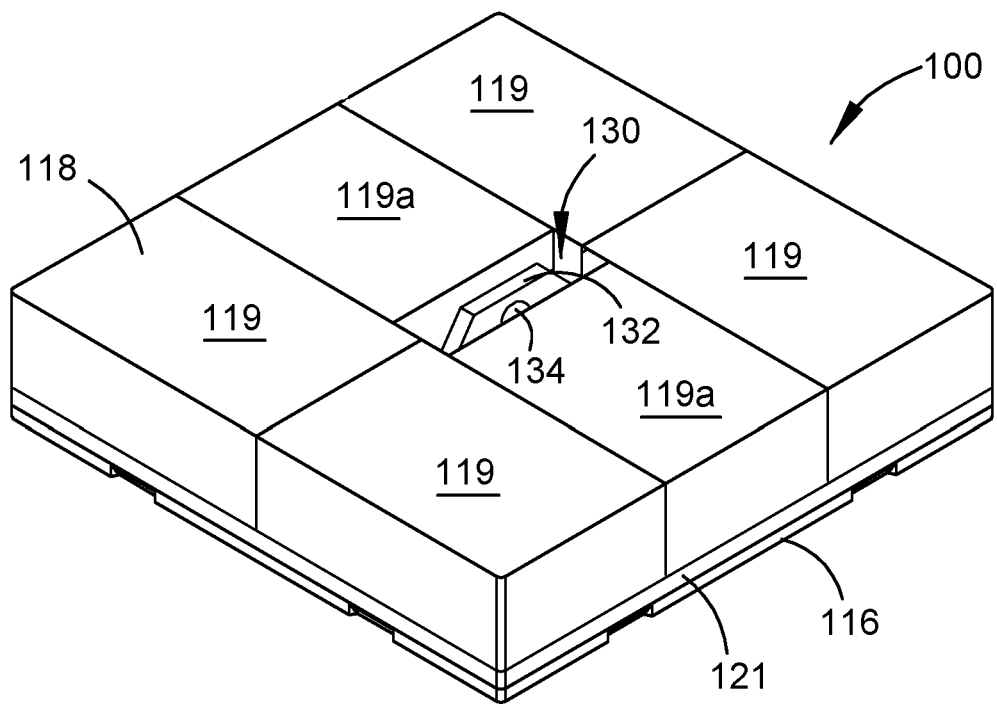
FIG. 8 is perspective view of a magnetic wear liner in accordance with another embodiment of the present invention.
Figure 9:
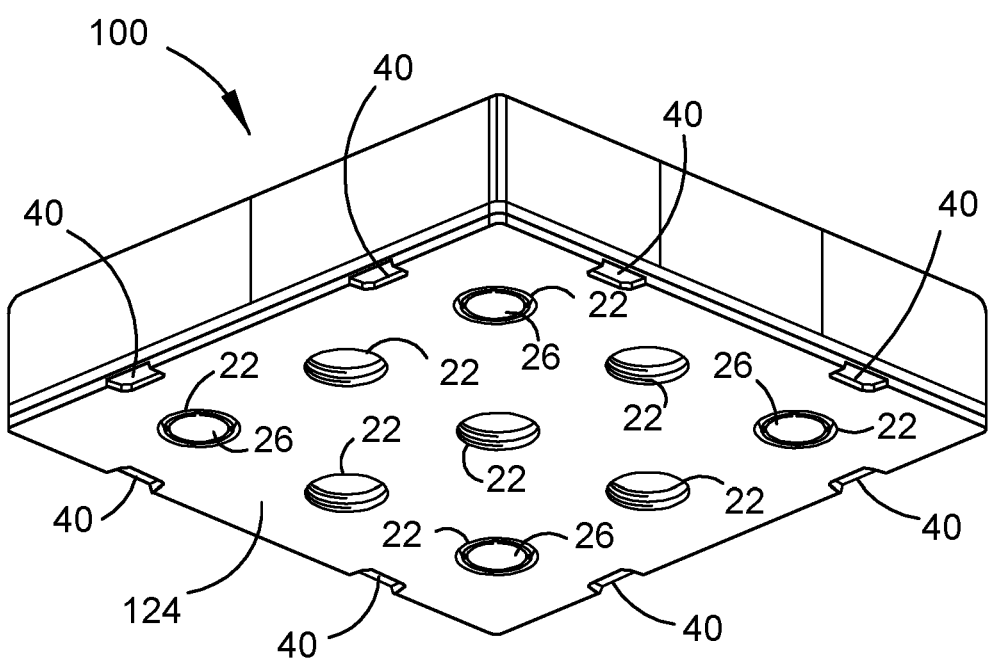
FIG. 9 is an underside perspective view of the magnetic wear liner of FIG. 8.

With reference now to FIGS. 8 and 9, to assist in removal of damaged or worn wear liners 10, magnetic wear liner 100 has been provided in accordance with a further embodiment of the present invention. As with the previous embodiments, wear liner 100 includes a substantially rigid base 116 and one or more wear lining tiles 118 disposed on one side 120 of the rigid base. The wear lining tiles include a plurality of blocks 119 formed from a ceramic or suitable material known in the art. Blocks 119 are adhered in position in a rubber mounting 121 to define a wear lining surface, with the rubber mounting 121 being adhered to the rigid base 116 as described earlier. As best shown on FIG. 9 and as with the other embodiments, wear liner 100 also includes an array of equidistantly spaced recesses 22, each recess being screwingly, or otherwise, engageable with one magnet device 26 by access from its underside 124.

In these respects, magnetic wear liner 100 is structurally similar to magnetic wear liner 10 and magnetic wear liner 50 of the earlier embodiments. However, in this embodiment, the blocks 119 do not completely cover the rigid base 116. Rather, centre blocks 119a have been sized to define a central clearance space 130 for access to a lifting eye plate 132 including access hole 134.

Lifting eye plate 132 is positioned and affixed on the centre axis of the rigid base 116 to assist in the removal of the wear liner 100 from the underlying surface once installed. In this respect, if the rigid base is formed from a metallic material, the lifting eye plate 132 may be welded to the rigid base. If the rigid base is formed from a thermoplastic or thermoset material, the lifting eye plate 132 may be adhered to the rigid plate. In a further variation, the lifting eye plate may be moulded with the rigid base. Importantly, according to the present embodiment, eye plate 132 does not protrude above the top of centre blocks 119a and therefore will not interfere with the wear lining function of the blocks 119a and 119.

Figure 10:
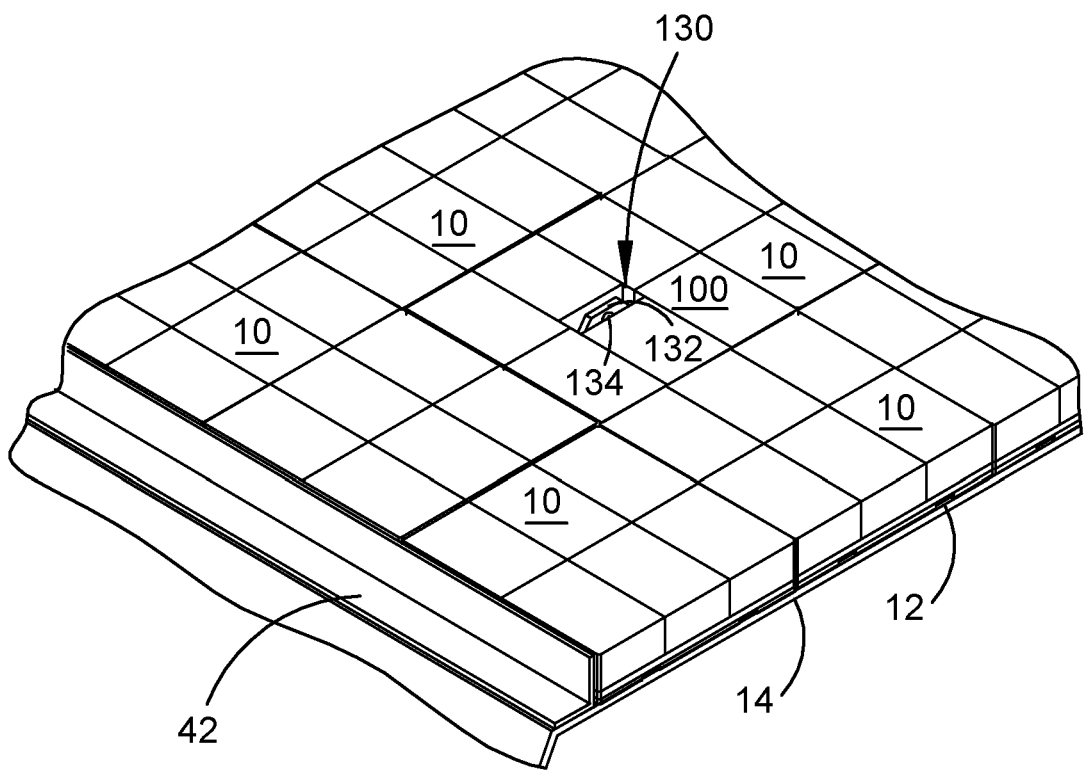
FIG. 10 is a perspective view of the wear liner of FIG. 8, shown installed on an underlying surface in contiguous engagement with a plurality of the wear liners of FIG. 1.

As best shown in FIG. 10, is proposed that wear liner 100 be installed within a group of wear liners 10 of the first embodiment to assist in removal of a worn wear liner 10 proximate to the position of wear liner 100. In this respect, it is proposed that the wear liner 100 is installed at strategic locations throughout large chutes and hoppers to easily facilitate access to worn wear liners. The final location of each wear liner 100 would be positioned at the discretion of the mine maintenance personnel with the objective of allowing access to different parts of the materials handling device 12 such that when wear liners 10 require replacement, it is not necessary to remove all the wear liners 10 between the worn wear liner and an edge of the of surface 12.

With reference now to FIGS. 11 to 14, a lifting frame 150 has been provided to lift wear liner 100 away and break the magnetic seal from the underlying metallic surface 12 once installed. Advantageously, this allows the wear liner 100 to be removed from the material handling device 14 without having to remove surrounding wear liners 10 thereby providing quicker access to a closely positioned worn or damaged wear liners 10.

In this application, the lifting frame 150 includes four arms 152 obliquely extending from a central boss 154 at one end to a square base 156 at the other. A threaded rod 158 extends through a clearance bore 160 in the boss to engage with a nut 162 at one end. The other end of rod 158 includes a hook formation 164, which is adapted to engage with the access hole 134 in the lifting eye plate 132.

Figure 11:
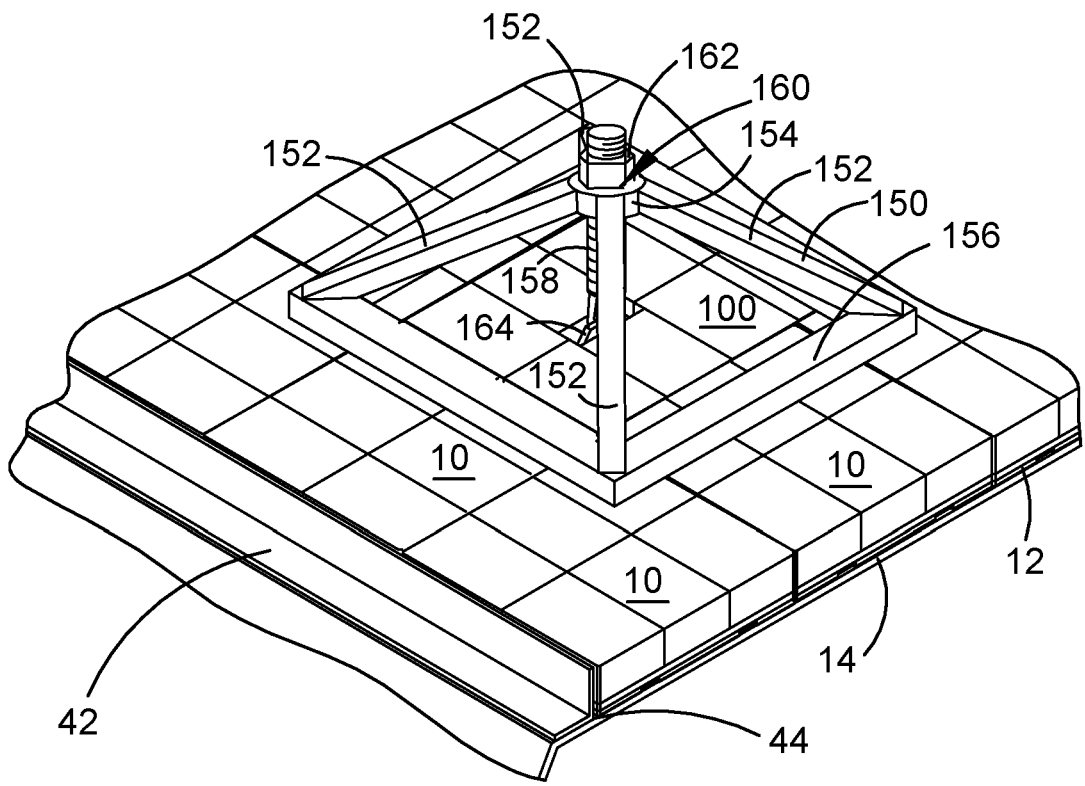
FIG. 11 is a perspective view of a lifting frame placed over one of the wear liners of FIG. 10.
Figure 12:
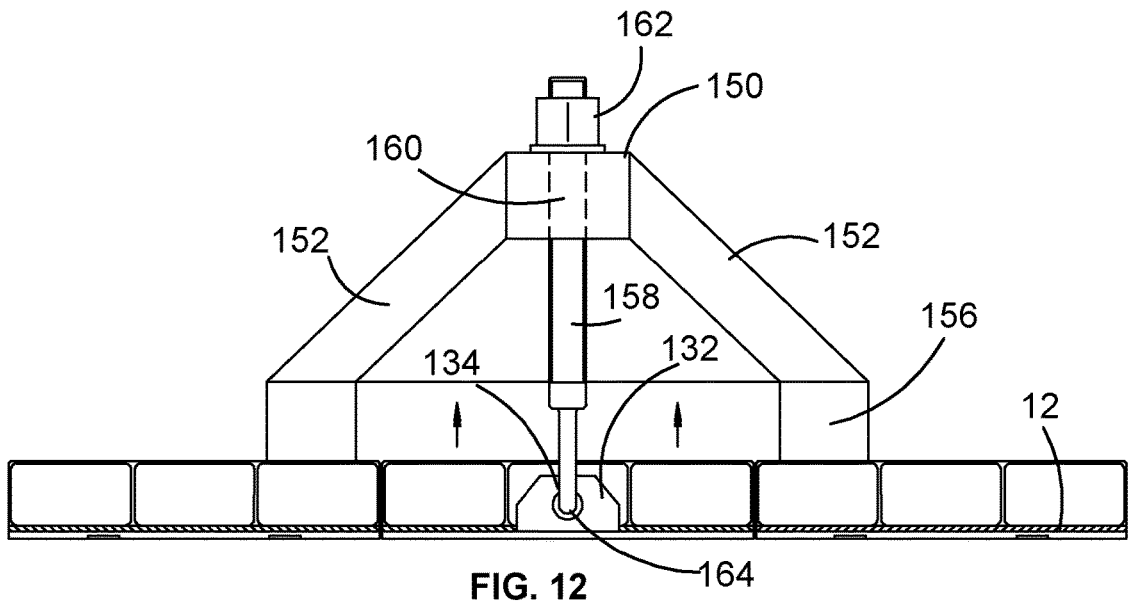
FIG. 12 is cross sectional view of FIG. 11.
Figure 13:
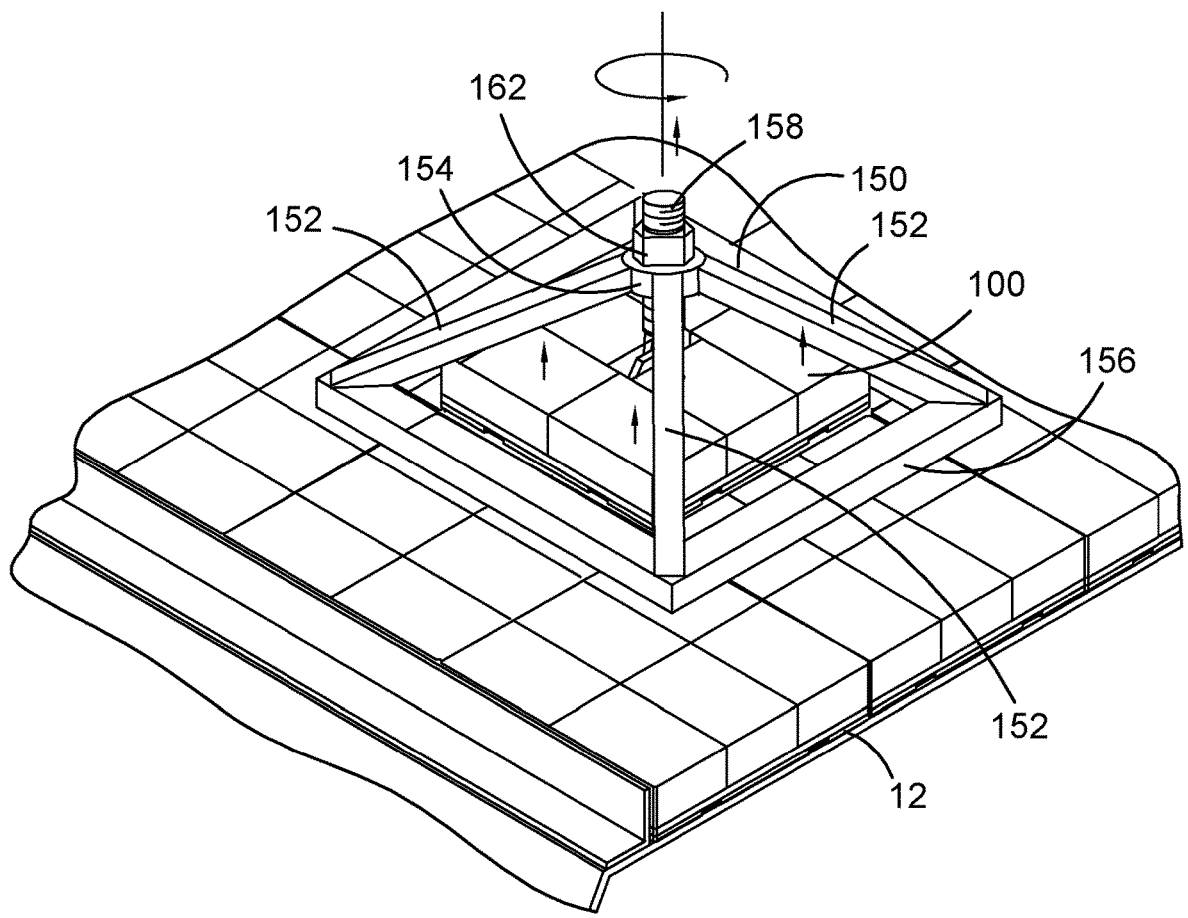
FIG. 13 is a perspective view of a lifting frame placed over one of the wear liners of FIG. 10, whereby the wear liner is shown being lifted off the underlying surface.
Figure 14:
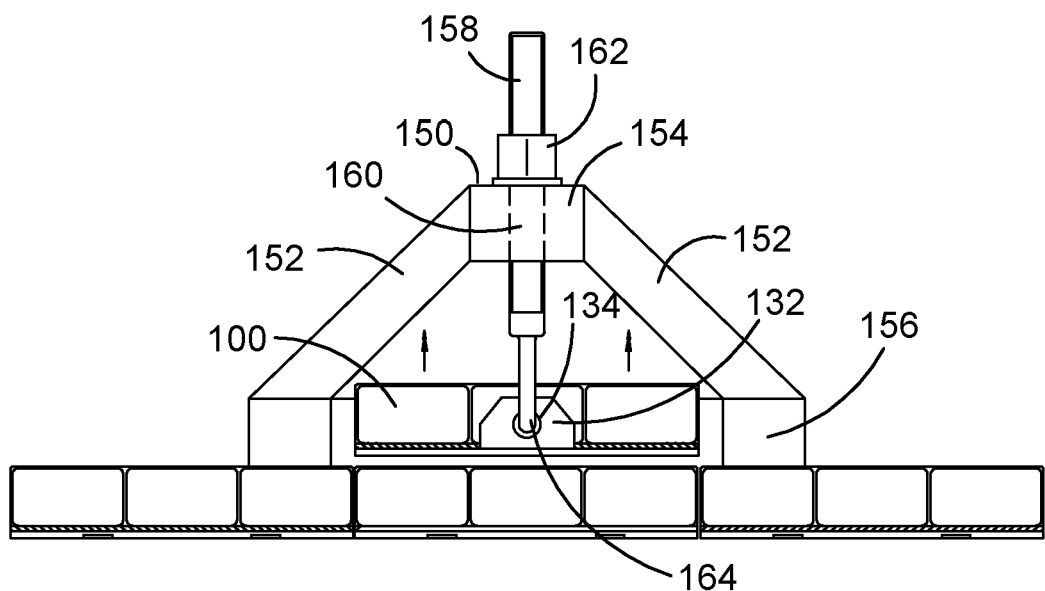
FIG. 14 is cross sectional view of FIG. 13.

In use, and as best shown initially in FIGS. 11 and 12, the lifting frame is placed over the magnetic wear liner 100 that is closest to a worn magnetic wear liner 10 to be replaced. The hook formation 164 is then engaged with the hole 134 in the lifting eye plate 132. Moving to FIGS. 13 and 14, nut 162 is then rotated to create an upward movement of the threaded rod 158. This upward movement breaks the magnetic seal allowing a user to then move the magnetic wear liner 100 off and away from the underlying surface 12.

Once the wear liner 100 is removed, other wear liners 10 are then easily removed using the previously levering method to reach the damaged or worn wear liner. That is, by levering out each wear liner using cut-outs 40 to reach the damaged or worn wear liner. In this regard, it should be noted that removal of the magnetic wear liner 100 exposes the cut-outs 40 of the adjacent wear liners 10 making them easy to remove. Once the worn wear liner is replaced, the removed wear liners 10 and wear liner 100 are reinstalled in reverse order.

It should be appreciated that the magnetic wear liner of the present invention is quicker to install than prior art wear liners that use mechanical fasteners. This advantageously results in less downtime for a mining operation. Furthermore, no pre-drilling of the underlying metallic surface 12 is required. The only tools that are required are tools to install the magnet devices, a common crowbar, claw hammers or other small lever tools to remove the wear liners when required, and a lifting frame 150 may also be used.

Advantageously, the magnetic wear liner of the present invention can be installed on surfaces of existing material handling devices, even if those surfaces include installation holes for prior art wear liners. In other words, no retrofitting of existing material handling equipment is necessarily required.

Further advantageously, use of the magnetic wear liners 10 of the present invention removes the requirement for access to the outside of the materials handling device when installing or removing the wear liners as required in the prior art. This results in a safer and faster removal and installation operation that does not necessarily require scaffolding for access.

The wear liners are relatively cheap to manufacture and those formed from primary thermoplastic or thermoset plastic materials are lighter than prior art wear liners made of steel, making them easier to carry and transport.

It should be appreciated that in the above description of exemplary embodiments of the invention, various features of the invention are sometimes grouped together in a single embodiment, Figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

While there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A magnetic wear liner for protecting an underlying metallic surface of a materials handling device from wear or damage during use, said wear liner including:
   a substantially rigid base;
   one or more wear lining tiles disposed on one side of said rigid base; and
   one or more magnet devices engageable with said rigid base such that a selective portion of said wear liner is magnetically attracted to said underlying metallic surface,
   wherein said rigid base includes one or more recesses and said one or more magnet devices are removably engageable with said one or more recesses.

2. A magnetic wear liner according to claim 1, wherein said one or more magnet devices are screwingly engageable with said one or more recesses.

3. A magnetic wear liner according to claim 1, wherein each of said one or more magnet devices includes a magnet and an outer retaining ring.

4. A magnetic wear liner according to claim 1, wherein upon engagement between said one or more magnet devices and said one or more recesses, said one or more magnet devices do not protrude past the other side of said rigid base.

5. A magnetic wear liner according to claim 1, wherein said one or more recesses are equidistantly spaced about said rigid base.

6. A magnetic wear liner according to claim 1, wherein said rigid base is formed from a thermoplastic or thermoset material.

7. A magnetic wear liner according to claim 1, wherein each of said one or more magnet devices includes two or more peripherally located locking cut-outs for allowing installation and removal.

8. A magnetic wear liner according to claim 1, wherein said rigid base includes at least one peripherally located cut-out for allowing said wear liner to be levered from said underlying metallic surface.

9. A magnetic wear liner according to claim 1, wherein said one or more wear lining tiles include one or more ceramic blocks.

10. A magnetic wear liner according to claim 1, wherein said one or more wear lining tiles includes one or more steel blocks.

11. A magnetic wear liner according to claim 9, wherein said one or more blocks are adhered to said rigid base.

12. A magnetic wear liner according to claim 1, including a lifting eye plate for lifting said magnetic wear liner from said underlying metallic surface.

13. A magnetic wear liner according to claim 12, wherein said lifting eye plate protrudes from said rigid base.

14. A magnetic wear liner according to claim 12, wherein said lifting eye plate includes an access hole.

15. A method of installing one or more magnetic wear liners according to claim 1, on an underlying metallic surface of a materials handling device, the method including said steps of:
  i) selectively engaging said one or more magnet devices with said rigid base such that a selective portion of said wear liner is magnetically attractable to said underlying metallic surface; and
  ii) positioning each magnetic wear liner in a desired position on said underlying metallic surface in a contiguous orientation relative to a previously installed magnetic wear liner.

16. A method of installing a magnetic wear liner according to claim 15 including the step of cutting one of said magnetic wear liners such that it defines a selective size.

17. A method of installing a magnetic wear liner according to claim 15, including the step of installing a stop bar on said underlying metallic surface.

18. A method of installing a magnetic wear liner according to claim 17, including the step of positioning said magnetic wear liner in abutting engagement with said stop bar.

19. A magnet device for use in a magnetic wear liner according to claim 1.

* * * * *